Feb. 22, 1938.   A. T. SEREDA   2,109,184
VEHICLE SIGNAL
Filed Jan. 4, 1937   2 Sheets-Sheet 1
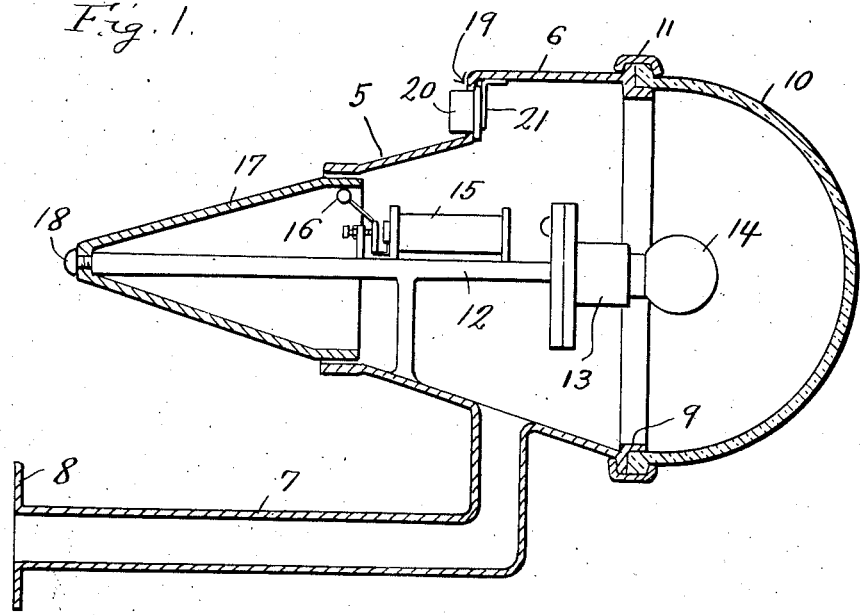
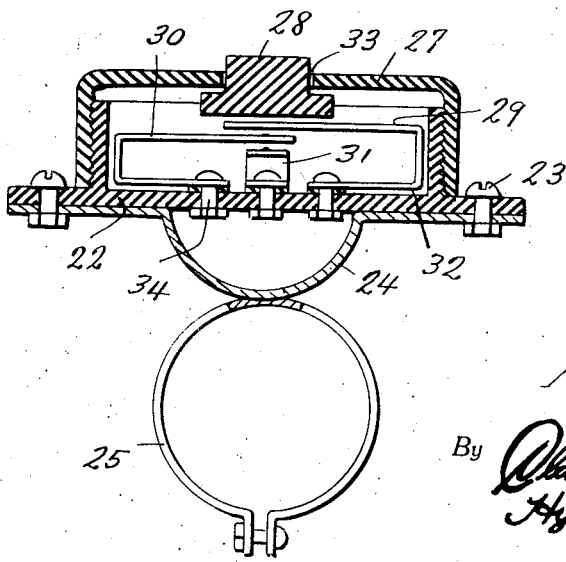
Inventor
Alois T. Sereda
By Clarence A. O'Brien
Hyman Berman
Attorneys Feb. 22, 1938.   A. T. SEREDA   2,109,184
VEHICLE SIGNAL
Filed Jan. 4, 1937    2 Sheets-Sheet 2

Inventor
Alois T. Sereda
By Clarence A. O'Brien
Hyman Berman
Attorneys

Patented Feb. 22, 1938

2,109,184

UNITED STATES PATENT OFFICE 2,109,184

VEHICLE SIGNAL

Alois T. Sereda, Chicago, Ill.

Application January 4, 1937, Serial No. 119,013

1 Claim. (Cl. 177—324)

The present invention relates to vehicle signals and has for its principal object to provide a signaling element embodying visible and audible signaling means.

A further object is to provide switch means for controlling the visible and audible signaling element selectively operable by the operator to energize the visible signaling element alone or to simultaneously energize both the audible and visible signaling elements.

A still further object is to provide a signal housing embodying a bracket for mounting upon a suitable part of a vehicle and which includes the visible and audible signaling elements mounted in the housing as a unitary structure.

A still further object is to provide an apparatus of this character of simple and practical construction, neat and attractive in appearance, relatively inexpensive to manufacture and install in operation, efficient and reliable in performance and otherwise well adapted for the purpose for which the same is intended.

Other objects and advantages reside in the details of construction and operation as more fully hereinafter described and claimed, reference being had to the accompanying drawings forming part hereof, wherein like numerals refer to like parts throughout and in which:—

Figure 1 is a vertical longitudinal sectional view through the signaling housing and supporting bracket therefor.

Figure 2 is a sectional view through the switch.

Figure 3:
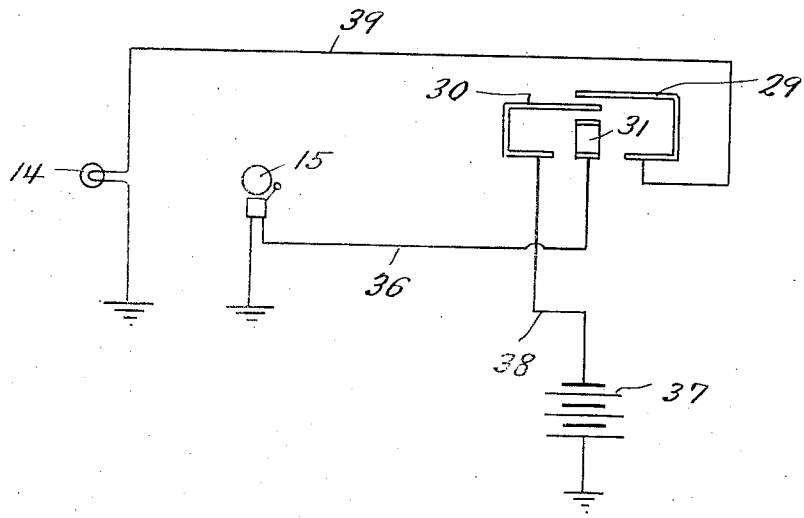
Figure 3 illustrates the wiring diagram.
Figure 4:
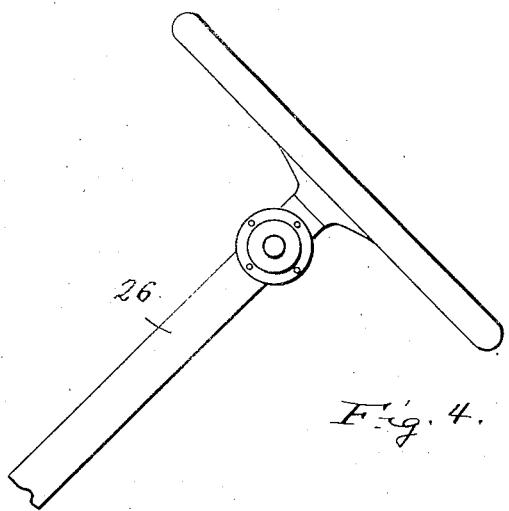
Figure 4 is a fragmentary side elevational view of an automobile steering wheel showing the switch mounted in position thereon.

Referring now to the drawings in detail, wherein for the purpose of illustration I have disclosed a preferred embodiment of the invention, the numeral 5 designates a signaling housing generally which is of streamline design and embodies a central annular portion 6 from which a conduit 7 extends from its underside, said conduit having a flange end 8 for attaching the same to a suitable part of an automobile. The front end of the portion 6 of the housing is recessed inwardly as shown at 9 to form a seat for the edge of a glass cover 10 of substantially semi-spherical construction and secured in position by an annular band 11 connecting the abutting edges of the housing section 6 and cover 10 as will be apparent from an inspection of Figure 1 of the drawings.

Supported within the housing section 6 is a longitudinally extending bracket 12 having a lamp socket 13 secured to its forward end within which is mounted a signaling lamp 14, said bracket also forming a support for an electromagnet 15 having a clapper or striker 16 operatively associated therewith and positioned in striking engagement with the inner surface of a conical bell 17 having its forward open end inserted inwardly of the rear end of the housing section 6 and its opposite end converging into substantial conical formation and secured to the rear end of the bracket 12 by a screw 18. The sides of the bell 17 are spaced slightly from the rear end of the housing 5, as will be observed from an inspection of Figure 1 of the drawings to prevent interference with the production of the desired ringing tone upon the striking of the bell by the clapper 16.

The upper portion of the housing section 6 is formed with a vertical offset portion 19 within which is formed a window opening having a glass 20 positioned therein and secured therein by means of a bracket 21. The window 20 constitutes a tell-tale means by which the operator is able to determine whether or not the lamp 14 is functioning and also acts as a signal which may be observed from the rear of the vehicle.

An insulated switch housing 22 is bolted as at 23 to a bracket 24 having a clamp 25 for securing to the steering post 26 of the vehicle. The switch housing 22 is provided with a threaded cap 27 within which is positioned a push button 28. Within the switch housing 22 is positioned a plurality of switch elements 29, 30 and 31. Each of these switch elements is formed of spring strips bent into a U-shape formation and include a short arm 32 and a long arm 33. The switch members are arranged with their short arms secured to the bottom of the switch housing 22 by bolts 34, which constitute terminals and with the long arms 33 arranged in overlying relation with respect to each other, as will be clearly apparent from an inspection of Figure 2 of the drawings. The switch member 31 is positioned under the members 29 and 30 and is connected to the electromagnet 15 by a wire 36. The switch element 30 is positioned between the switch elements 29 and 31 and is connected to a battery or other source of current 37 by means of a wire 38 and the switch element 29 which has its long arm positioned uppermost is connected to the lamp 14 by means of a wire 39.

The switch elements 29, 30 and 31 are normally spaced apart, as clearly illustrated in Figures 2 and 3 of the drawings and accordingly upon the initial application of pressure to the push button 28 the switch arms of the element 29 and 30 will first be brought into contact to close the circuit from the battery to the lamp to energize the latter and upon a continuation of the pressure upon the push button 28 the switch member 31 will be brought into contact to close the circuit leading to the electro-magnet 15 for energizing the same and ringing the bell 17. It will be understood that the circuit wires leading from the battery to the lamp and electro-magnet are fed through the conduit 7 into the housing 5.

It is believed the details of construction and operation of the invention will be readily understood from the foregoing without further detail explanation thereof.

Having thus described the invention what I claim is:—

A signal device comprising a housing open at its ends, a lens mounted on one end of said housing, a bracket secured in said housing and extending through and beyond the opposite open end thereof, an electric lamp carried by said bracket, a bell secured at one end on said extended portion of the bracket and having an open end arranged in and spaced from the adjacent open end of the housing, a striker complementary to said bell and arranged in the housing, and electro-mechanical means in the housing and on said bracket for actuating the striker.

ALOIS T. SEREDA.